United States Patent
Moon et al.

(10) Patent No.: US 10,619,576 B2
(45) Date of Patent: Apr. 14, 2020

(54) APPARATUS AND METHOD FOR CONTROLLING VARIABLE VALVE TIMING IN INTERNAL COMBUSTION ENGINE

(71) Applicant: HYUNDAI MOTOR COMPANY, Seoul (KR)

(72) Inventors: Chi-Ho Moon, Hwaseong-si (KR); Kyu-Min Hwang, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 142 days.

(21) Appl. No.: 15/278,899

(22) Filed: Sep. 28, 2016

(65) Prior Publication Data

US 2017/0159578 A1    Jun. 8, 2017

(30) Foreign Application Priority Data

Dec. 8, 2015  (KR) ........................ 10-2015-0173877

(51) Int. Cl.
*F02D 13/02* (2006.01)
*F02D 41/00* (2006.01)
*F01L 1/344* (2006.01)

(52) U.S. Cl.
CPC ..... *F02D 13/0219* (2013.01); *F02D 13/0261* (2013.01); *F02D 41/0007* (2013.01); *F01L 1/344* (2013.01); *F01L 2800/00* (2013.01); *F02D 2041/001* (2013.01); *F02D 2200/0406* (2013.01); *F02D 2200/101* (2013.01); *Y02T 10/144* (2013.01); *Y02T 10/18* (2013.01); *Y02T 10/42* (2013.01)

(58) Field of Classification Search
USPC .......................................... 123/90.15, 90.17
See application file for complete search history.

(56) References Cited

U.S. PATENT DOCUMENTS

| 5,427,078 | A | * | 6/1995 | Hitomi | ..................... | F02B 27/02 |
| | | | | | | 123/184.53 |
| 5,482,012 | A | * | 1/1996 | Yoshioka | ............ | F01L 1/34406 |
| | | | | | | 123/90.15 |
| 5,529,031 | A | * | 6/1996 | Yoshioka | .................. | F01L 1/34 |
| | | | | | | 123/339.24 |
| 7,275,516 | B1 | * | 10/2007 | Cunningham | ........ | F02B 25/145 |
| | | | | | | 123/305 |

(Continued)

FOREIGN PATENT DOCUMENTS

| JP | 2009-138733 A | 6/2009 |
| JP | 4816812 B2 | 11/2011 |
| JP | 2012-163047 A | 8/2012 |

(Continued)

*Primary Examiner* — Patrick Hamo
*Assistant Examiner* — Wesley G Harris
(74) *Attorney, Agent, or Firm* — Morgan, Lewis & Bockius LLP

(57) ABSTRACT

An apparatus for controlling a variable valve timing (VVT) in an internal combustion engine, which varies an opening and closing time of an intake valve and an exhaust valve by controlling a rotation phase of a camshaft with respect to a crankshaft of the internal combustion engine, includes a controller configured to determine whether an engine state enters a scavenging region or not in an overlap area of the intake valve and the exhaust valve and to control the VVT to reduce a valve overlap period depending on a period of time elapsed after the engine state enters the scavenging region.

10 Claims, 7 Drawing Sheets

(56) References Cited

U.S. PATENT DOCUMENTS

2005/0000480 A1* 1/2005 Yasui ................. F01L 1/08
 123/90.16
2008/0077304 A1* 3/2008 Suzuki ............... F02B 37/162
 701/102

FOREIGN PATENT DOCUMENTS

| JP | 5212552 B2 | 6/2013 |
| JP | 2013-185536 A | 9/2013 |
| KR | 10-2013-0020600 | 2/2013 |
| KR | 10-1497861 B1 | 3/2015 |

* cited by examiner

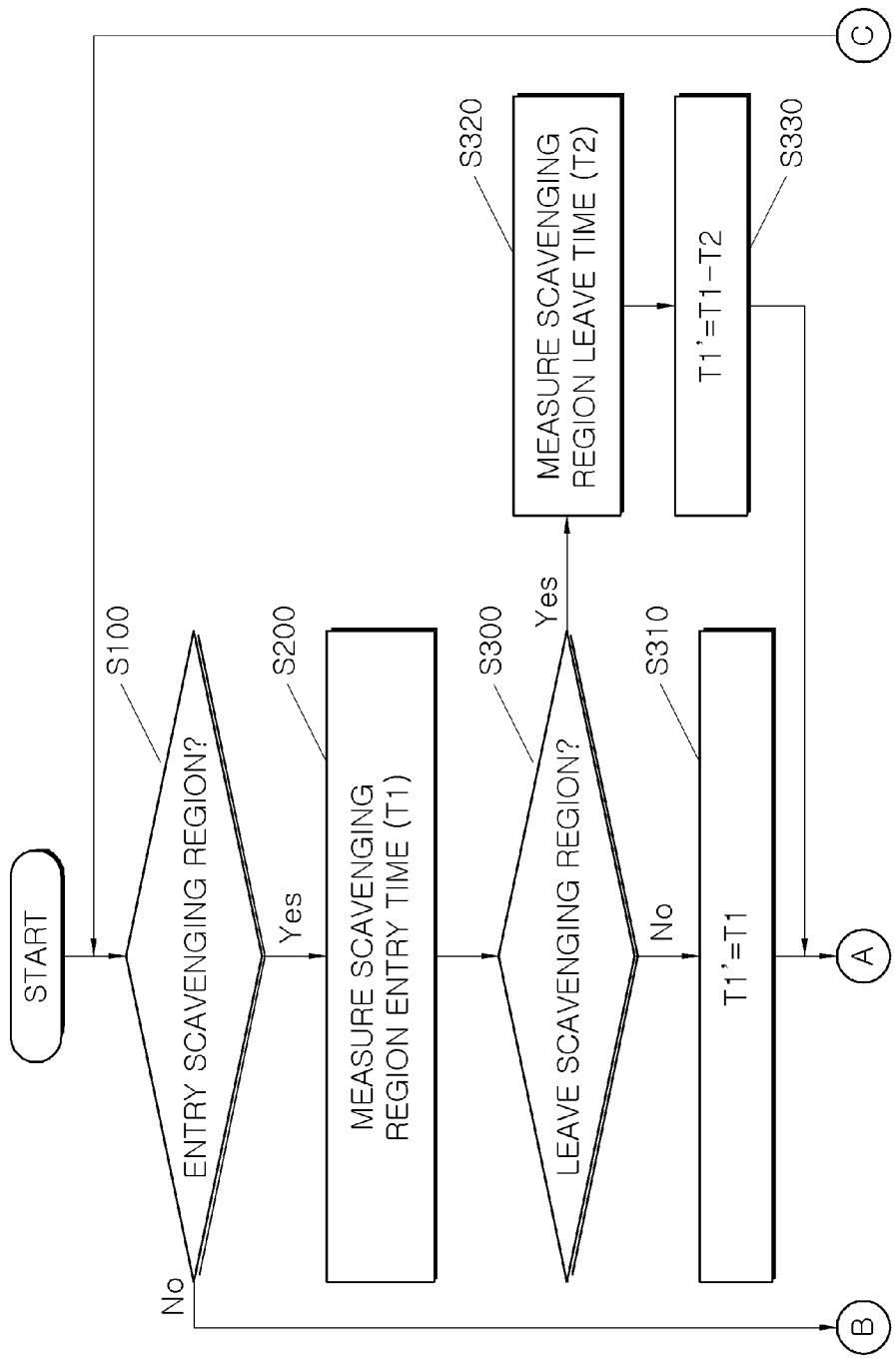

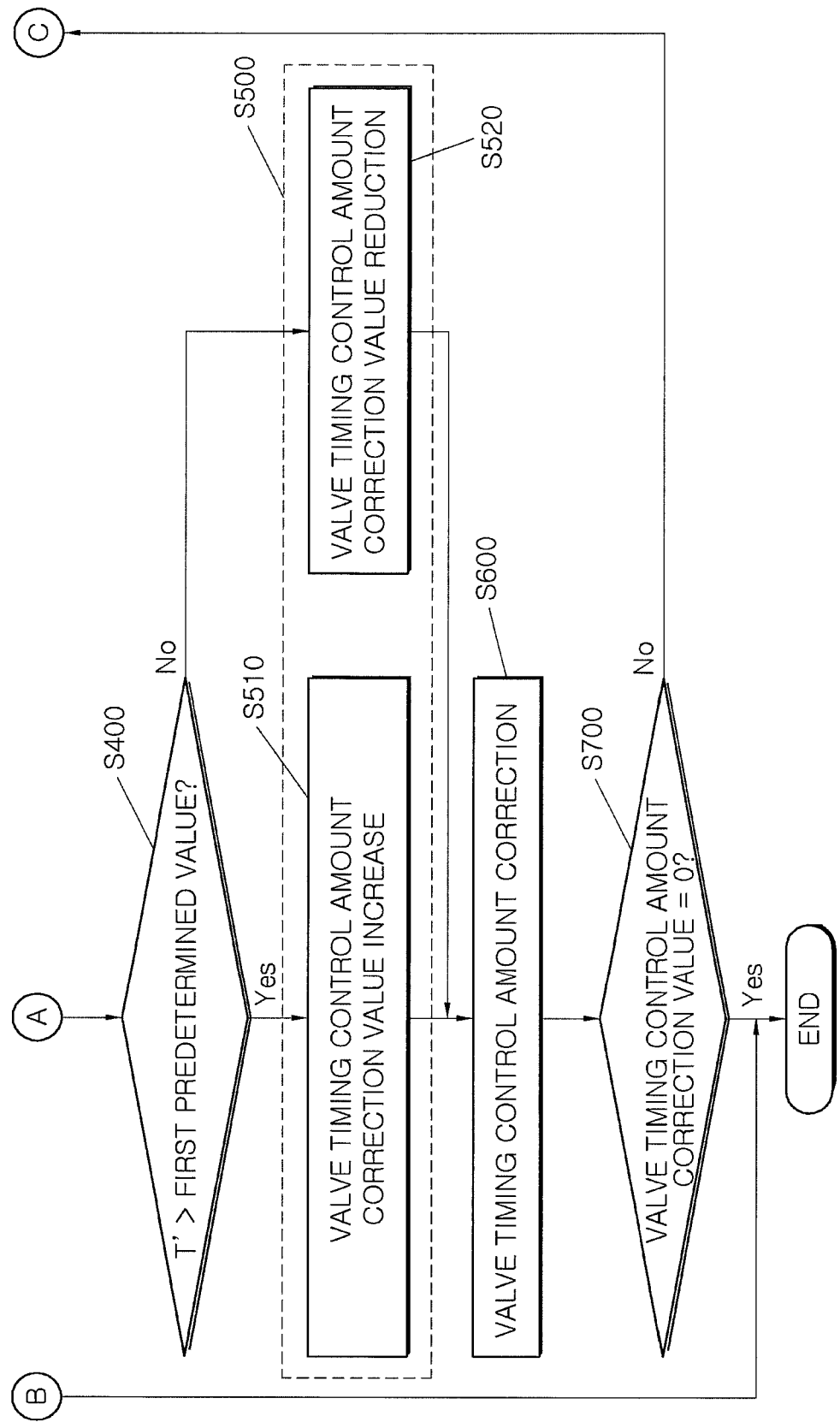

APPARATUS AND METHOD FOR CONTROLLING VARIABLE VALVE TIMING IN INTERNAL COMBUSTION ENGINE

CROSS-REFERENCE TO RELATED APPLICATION

This application claims the benefit of priority to Korean Patent Application No. 10-2015-0173877 filed in the Korean Intellectual Property Office on Dec. 8, 2015, which is incorporated herein by reference in its entirety.

TECHNICAL FIELD

The present disclosure relates to an apparatus and a method for controlling variable valve timing in an internal combustion engine, and more particularly, an apparatus for controlling variable valve timing in an internal combustion engine capable of preventing catalyst damage in a scavenging state in which fresh air is directly transferal from an intake port to an exhaust port of the engine, and a method for the same.

BACKGROUND

Recently, an internal combustion engine is equipped with a turbocharger and an intercooler in order to reduce fuel consumption and obtain a large output. In such an internal combustion engine, a compressor of the turbocharger draws in and compresses exhaust gas or outside air, so that supercharged air generated during this process is supplied to the engine.

FIG. 5 shows an engine having a conventional turbocharger. Supercharged air passes through a turbocharger 20 and is supplied to a combustion chamber 11 inside of a cylinder 16 of an engine 10 through an intake port 12, and exhaust gas combusted in the combustion chamber 11 discharges through an exhaust port 13.

However, in the engine 10 having the turbocharger 20, an intake pressure in the intake port 12 is larger than an exhaust pressure in the exhaust port 13 in some portion by boost pressure rise in a low speed and high load region. In this case, fresh air 30 is supplied through the intake port 12 and directly transferred to the exhaust port 13 in the portion that an intake valve 14 and an exhaust valve 15 are overlapped, as shown in FIG. 5.

Since scavenging efficiency increases under a scavenging state so that the residual gas amount in the combustion chamber 11 reduces, fuel charging efficiency increases, and the torque increases.

The amount of fresh air 30 transferal to the exhaust port 13 increases, however, under the scavenging state, an oxygen sensor installed around a catalyst device 40 may recognize that combustion is in a lean state. Due to this determination result, a fuel amount being supplied to the combustion chamber 11 increases so that the amount of un-burn fuel may increase in the combustion chamber 11. If the un-burn fuel is directly transferred to a catalyst through the exhaust port 13, the un-burn fuel reacts with the fresh air so that after-combustion may be occurred in the catalyst device 40. Accordingly, the temperature of the catalyst increases so that the catalyst device 40 may be damaged.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and the present disclosure proposes an apparatus and a method for controlling variable valve timing in an internal combustion engine capable of preventing catalyst device from being damaged in an exhaust system when an engine having a turbocharger is in a scavenging state.

An apparatus for controlling variable valve timing in an internal combustion engine according to an exemplary embodiment in the present disclosure includes a controller configured to determine whether a current engine state enters a scavenging region or not in an overlap area of the intake valve and the exhaust valve and to control the VVT to reduce a valve overlap depending on a period of time period elapsed after the engine state enters the scavenging region.

The controller may determine whether the engine state enters the scavenging region or not by combining at least two or more measurement values among the VVT, a revolutions per speed (RPM) of the engine, a pressure of an intake port and a temperature of the engine.

The controller may set the time elapsed after the engine state enters the scavenging region to an entry time, and control in order for the valve overlap period to be reduced by adjusting the VVT when the entry time exceeds constant time period.

The controller may measure the time elapsed after the engine leaves the scavenging region when the engine state leaves the scavenging region, and set the value subtracting the time period elapsed after the engine state leaves the scavenging region from the entry time to a new entry time so as to adjust the VVT.

A method for controlling variable valve timing in an internal combustion engine according to another exemplary embodiment in the present disclosure includes determining whether an engine state enters a scavenging region or not in an overlap area of an intake valve and an exhaust valve; measuring a first entry time period elapsed after the engine state enters the scavenging region; calculating a control correction amount of the VVT with respect to the intake valve or the exhaust valve depending on the entry time; and reducing a valve overlap period by adjusting the VVT depending on the control correction amount of the VVT apparatus.

The step of determining may determine whether the engine state enters the scavenging region or not, by combining at least two or more measurement values among the VVT, a revolutions per minute speed (RPM) of the engine, a pressure of an intake port and a temperature of the engine.

The method may further include the steps of: measuring an entry time elapsed after the engine state leaves the scavenging region when it is determined that the engine leaves the scavenging region after entering the scavenging region; and calculating the value subtracting the time period elapsed after the engine state leaves the scavenging region from the entry time as a new entry time.

The step of calculating the control correction amount may calculate the control correction amount by increasing the control correction amount towards a direction of reducing a valve overlap in order for the valve overlap to be reduced when the entry time exceeds a first predetermined value.

The step of calculating the control correction amount may calculate the control correction amount by reducing the control correction amount towards a direction of reducing a valve overlap in order for the valve overlap to be increased when the entry time is same to or less than the first predetermined value.

The step of calculating the control correction amount may end by determining that it is unnecessary to control the VVT for adjusting the valve overlap when the calculated control correction amount becomes zero "0."

According to the present disclosure, there are the effects that a torque loss can be minimized in a low speed and a high load region, and the damage of a catalyst device arranged in the exhaust system can be prevented, by actively adjusting a valve overlap as the time entering into the scavenging state elapses when an engine is under a scavenging state.

BRIEF DESCRIPTION OF THE DRAWINGS

The above and other objects, features and advantages of the present disclosure will be more clearly understood from the following detailed description taken in conjunction with the accompanying drawings.

FIGS. 3A and 3B are flow charts showing a method for controlling variable valve timing in an internal combustion engine according to the present disclosure.

DETAILED DESCRIPTION

Hereinafter, an exemplary embodiment according to the present disclosure will be described in detail with reference to the accompanying drawings.

Figure 1:
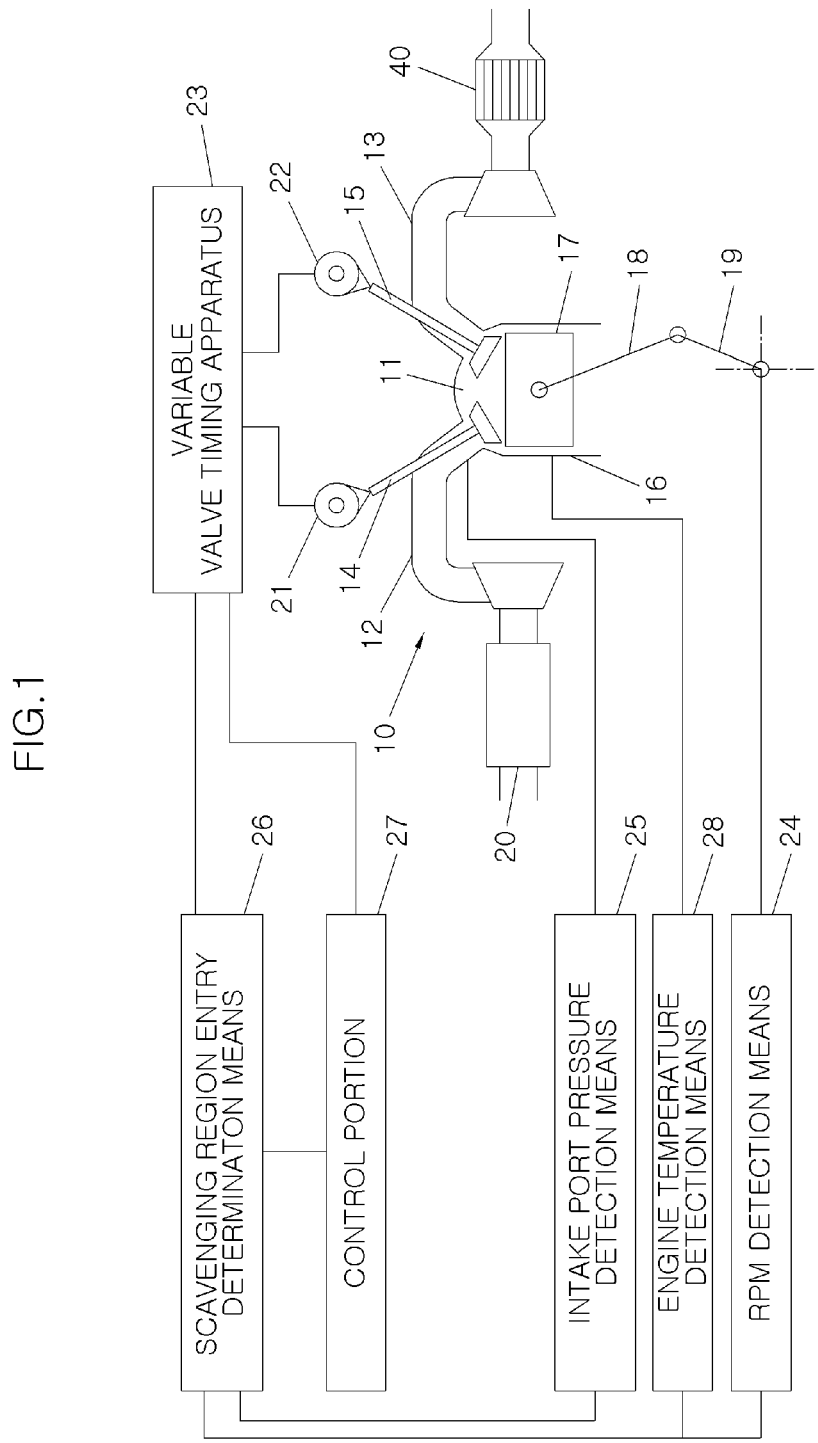
FIG. 1 is a drawing showing a system configuration of an apparatus for controlling variable valve timing in an internal combustion engine according to the present disclosure.

FIG. 1 is a drawing showing a rough system configuration of an apparatus for controlling variable valve timing in an internal combustion engine according to the present disclosure.

Inside a cylinder 16 of an engine 10, a piston 17 connected to a crankshaft 19 via a connecting rod 18 is disposed, and an inner space of the cylinder 16 above an upper portion of the piston 17 forms a combustion chamber 11.

A turbocharger 20 may be installed at an upper stream of an intake port 12 of the engine 10. The turbocharger 20 may draw in and compress exhaust gas or outside air through a compressor not shown, and supply air that is supercharged by this process to the combustion chamber 11 through the intake port 12.

The supercharged air supplied from the intake port 12 may be mixed with fuel supplied through a fuel injection valve not shown to form air/fuel mixture, and then, combusted in the combustion chamber 11. The exhaust gas then may be discharged to an exhaust system through the exhaust port 13.

At a lower stream of the exhaust port 13, a catalyst device 40 may be installed. The catalyst device 40 is an after-treatment device removing noxious gas, soot and harmful particle material, and so on, included in the exhaust gas.

An intake valve 14 and an exhaust valve 15 may adjust opening and closing of the intake port 12 and the exhaust port 13, respectively. The intake valve 14 and the exhaust valve 15 may be connected to an intake camshaft 21 and an exhaust camshaft 22, respectively, and open and close the intake port 12 and the exhaust port 13 depending on the rotation of each camshaft, respectively. The intake camshaft 21 and the exhaust camshaft 22 may be connected to a variable valve timing apparatus (VVT) 23 at each end thereof.

The VVT apparatus 23 is an apparatus capable of obtaining high fuel efficiency and high output simultaneously in a low speed driving region and a high speed driving region of the engine by changing the opening and closing time of the intake valve 14 and the exhaust valve 15 to be suitable to a rotational speed of the engine. The VVT apparatus 23 may adjust the valve timing through varying the valve timing by changing a rotation phase of the intake camshaft and exhaust camshaft 22 with respect to the crankshaft 19 by a predetermined control amount.

Figure 2:
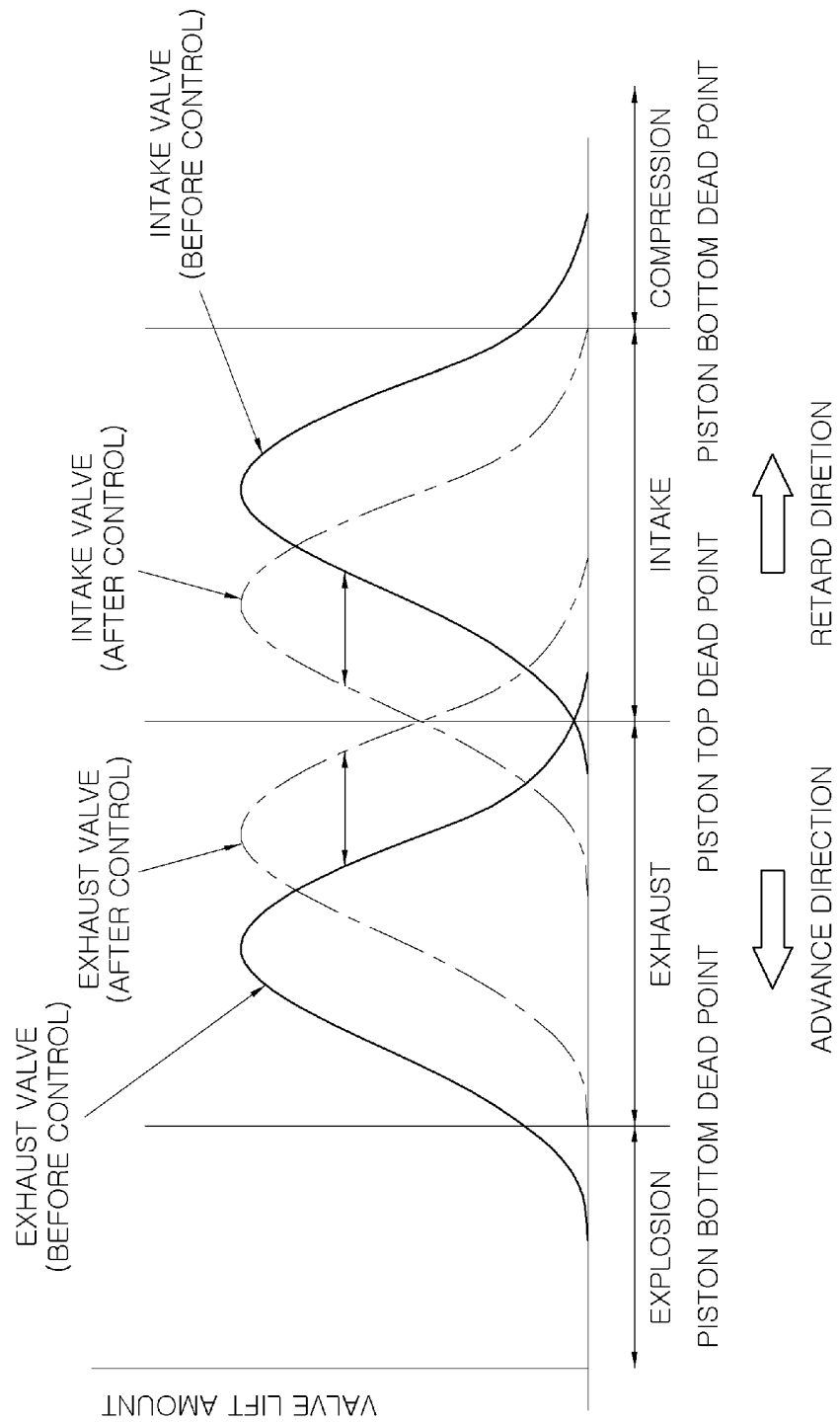
FIG. 2 is a drawing simply showing an intake and exhaust timing of an intake valve and an exhaust valve.

FIG. 2 shows an adjusting process of intake and exhaust timing in an intake valve and an exhaust valve by a VVT apparatus.

The solid curved line shown in FIG. 2 represents opening and closing timing of the intake valve 14 and the exhaust valve 15 when a rotation phase control of the camshafts 21 and 23 is not implemented by the VVT apparatus 23. As shown in FIG. 2, when the valve timing control is not implemented by the VVT apparatus 23, the exhaust valve 15 and the intake valve 14 each becomes biased toward an advance direction and a retard direction so that it will be understood that a the valve overlap period is very short.

The other dashed dotted curved line shown in FIG. 2 represents the opening and closing timing of the intake valve 14 and the exhaust valve 15 in a case that the valve timing control is implemented by the VVT apparatus 23. As shown in FIG. 2, it is possible to increase the valve overlap period between the exhaust valve 15 and the intake valve 14 by changing the opening and closing timing of the exhaust valve 15 toward the retard direction or the opening and closing timing of the intake valve 14 toward the advance direction.

At this time, the valve overlap period increases as the control amount of the VVT apparatus 23 increases, while the valve overlap period is reduced as reducing the control amount of the VVT apparatus 23. The valve overlap period between the intake valve 14 and the exhaust valve 15 may be adjusted by adjusting the control amount of the VVT apparatus 23.

In accordance with the contents shown in FIG. 1, the apparatus for controlling variable valve timing in an internal combustion engine according to the present disclosure may further include a scavenging region entry determination means 26 and a controller 27.

The scavenging region entry determination means 26 detects engine conditions and determining whether the current engine is in a scavenging state or not.

In the scavenging state, the pressure of the intake port 12 is higher than the pressure of the exhaust port 13 so that fresh air is directly transferred from the intake port 12 to the exhaust port 13. Therefore, the pressure value of intake port 12 may affect the determination for whether the current engine is in the scavenging state or not. In addition, the scavenging may occur in a state that all the intake port 12 and the exhaust port 13 are opened. Therefore, the valve timing control amount of the VVT apparatus 23 may affect the determination when the current engine slate enters into the scavenging state.

In addition, the engine having a turbocharger may enter the scavenging state in a low speed and a high load region.

Therefore, an engine rotational speed may affect the determination for whether the engine is in the scavenging state or not. Under the scavenging state, the un-burn fuel amount increases in the combustion chamber to affect combustion state of fuel. Therefore, the temperature of the engine 10 may affect the determination for whether the current engine is in the scavenging state or not.

Therefore, the engine 10 tends to be in the scavenging state when the valve timing is in a predetermined range, the revolutions per minute (RPM) of the engine 10 is in a predetermined range, the temperature of the engine 10 is in a predetermined range, or the pressure of the intake port 12 is in a predetermined range. Therefore, the scavenging region entry determination means 26 collects the information about the valve timing control amount of the VVT apparatus, the RPM of the engine, the temperature of the engine and the pressure of the intake port, and it is determined that the engine is in the scavenging state when at least two of the above conditions are satisfied.

As shown in FIG. 1, the information about the RPM of the engine may be obtained from a RPM sensor 24. The RPM sensor 24 may detect the RPM of the engine using a sensor detecting an angle of rotation of the crankshaft 19 engine. Furthermore, the information about the temperature of the engine may be obtained from an engine temperature sensor 28. The engine temperature sensor 28 may detect the temperature of the engine via a temperature sensor installed on inner and outer walls of the cylinder 16 in the engine. In addition, the information about the pressure of the intake port 12 may be obtained from an intake port pressure sensor 25. The intake port pressure sensor 25 may detect the pressure of the intake port 12 via a pressure sensor installed in the intake port 12.

The controller 27 may adjust the valve timing control amount of the VVT apparatus 23 depending on the determination result of the scavenging region entry determination means 26 and the elapse time under the scavenging state to control the valve overlap period. Therefore, the controller 27 may minimize the effect of the catalyst device 40 by scavenging, thereby preventing the catalyst device 40 from being damaged by afterburning occurred when un-burn fuel and fresh air is transferal to the catalyst device 40 in large quantities.

Hereinafter, a method for controlling variable valve timing in an internal combustion using the scavenging region entry determination means 26 and the controller 27 will be described with reference to FIGS. 3A and 3B.

FIGS. 3A and 3B are flow charts showing a method for controlling variable valve timing in an internal combustion engine according to the present disclosure. In the method for an internal combustion engine according to the present disclosure, firstly, the scavenging region entry determination means 26 may determine whether the engine enters the scavenging state or not (S100).

The scavenging region entry determination means 26 may receive a control amount of a VVT apparatus, an RPM of an engine, a pressure of an intake port and an a temperature of the engine from the VVT apparatus 23, the RPM sensor 24, the intake port pressure sensor 25, the engine temperature sensor 28, and combine at least two or more information among these to determine whether the engine 10 enters the scavenging state.

When it is determined that the engine 10 is under the scavenging state, the controller 27 may measure an entry time T1 that the engine 10 enters the scavenging state (S200).

The controller 27 may determine through the information from the scavenging region entry determination means 26 whether the engine 10 leaves the scavenging state again after entering the scavenging state (S300). When it is determined that the engine 10 leaves the scavenging state after entering the scavenging state, the controller 27 may measure time T2 during which the engine 10 leaves the scavenging state (S320).

When it is determined that the engine 10 enters the scavenging region and does not leave the scavenging state, time T1 measured initially becomes the time during the engine 10 is only in the scavenging state so that the control 27 considers the time as the entry time T1' (S310), and compares the entry time T1' with a first predetermined value (S400). The first predetermined value may be preset as a reference value capable of restraining overheating of a catalyst in consideration of the catalyst used in the catalyst device 40 or characteristics of fuel used in engine combustion.

When it is determined that the engine 10 leaves the scavenging state after entering the scavenging region, the pure scavenging state entry time T1' may be calculated by excluding the time T2 during leaving the scavenging state from the time T1 during leaving the scavenging region after entering the scavenging region (S330). In the case of leaving the scavenging state after entering scavenging region, since the after-burning is not occurred at the catalyst device 40 during leaving the scavenging state so that concerns for the catalyst device 40 to be damaged, such as a catalyst temperature is dropped down at the catalyst device 40, and so on, are not great, it is to exclude the time T2 during leaving the scavenging state from the entry time T1' becoming standards in whether implementing a valve overlap period control or not.

When the entry time T1' exceeds the first predetermined value, the controller 27 adjusts a control correction amount of the valve timing control amount of the intake valve and/or the exhaust valve in the VVT apparatus 23 (S500), and adjust the valve overlap period by correcting the valve timing control amount depending on the control correction amount (S600).

More concretely, when the entry time T1' exceeds the first predetermined value, the controller 27 determines that it is necessary to reduce the valve overlap in order to prevent the damage of the catalyst device 40. For this, the controller 27 increases the control correction amount in order for the valve timing control amount of the intake valve and/or the exhaust valve in the VVT apparatus 23 to be reduced (the valve overlap to be reduced). At this time, an initial control correction amount is determined with a predetermined value "a", and the predetermined control correction amount "a" is continuously increased by a constant ratio "b" or value "c" through the controller 27 (for example, changed control correction amount a'=a+a×c or a'=a+c over time). As shown in FIG. 2, if reducing the control amount with respect to the exhaust valve 15 and/or the intake valve 14, the valve overlap is reduced.

Furthermore, when the entry time T1' is same to or less than the first predetermined value, the controller 27 determines that it is unnecessary to reduce the valve overlap in order to prevent the damage of the catalyst device 40. Therefore, the controller 27 reduces the control correction amount in order for the valve timing control amount of the intake valve and/or the exhaust valve in the VVT apparatus 23 to be increased (the valve overlap to be increased) in the same way as increasing the control correction amount. As the valve timing control amount is reduced, the valve overlap is increased as shown in FIG. 2.

When the control correction amount becomes 0 as the result of calculating the control correction amount of the valve timing control amount of the intake valve and/or the exhaust valve in the VVT apparatus 23, the controller 27 may determine that it is unnecessary to control the valve overlap in order for preventing the damage of the catalyst device, and thus, end the control (S700).

Figure 4A:
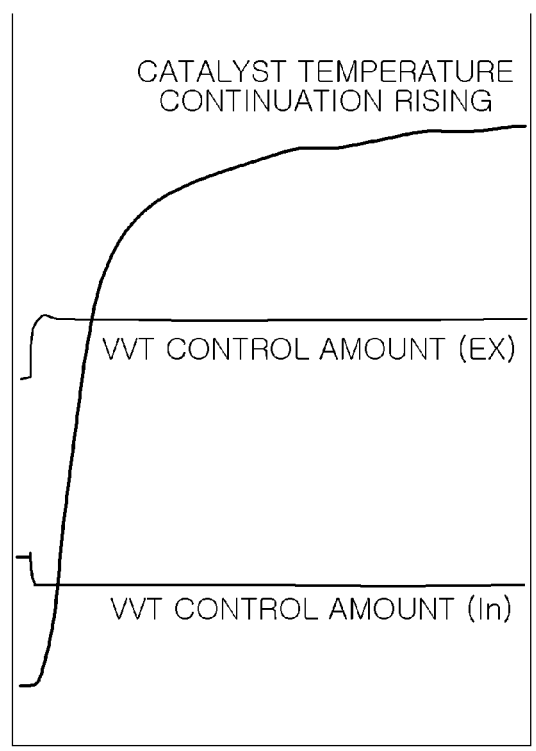
FIGS. 4A and 4B are drawings comparing effects of a method for controlling variable valve timing in an internal combustion engine according to the present disclosure with those of the related art.
Figure 4B:
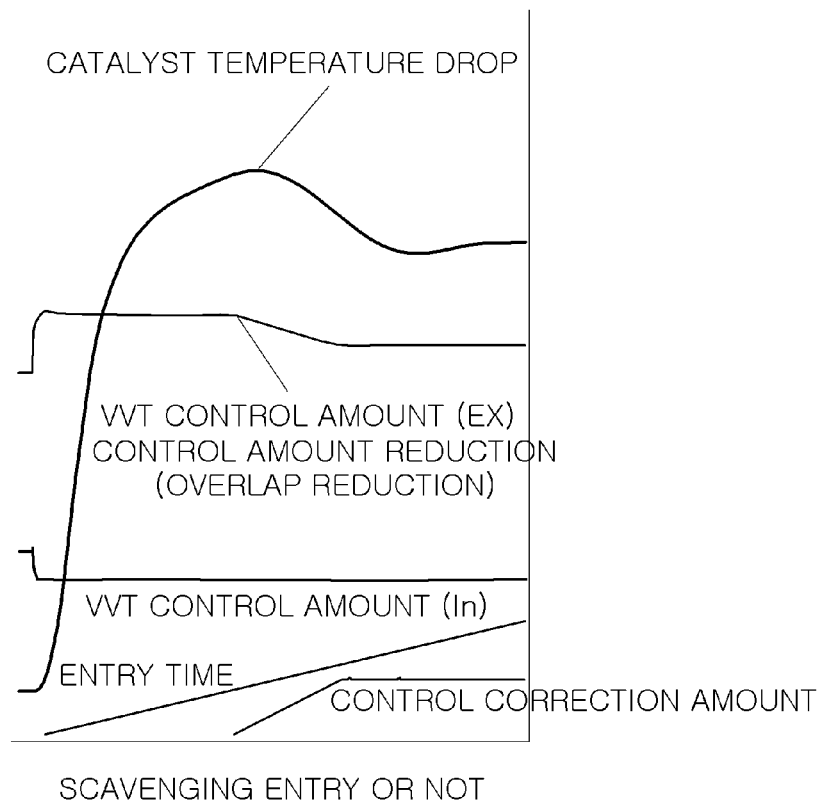
Figure 5:
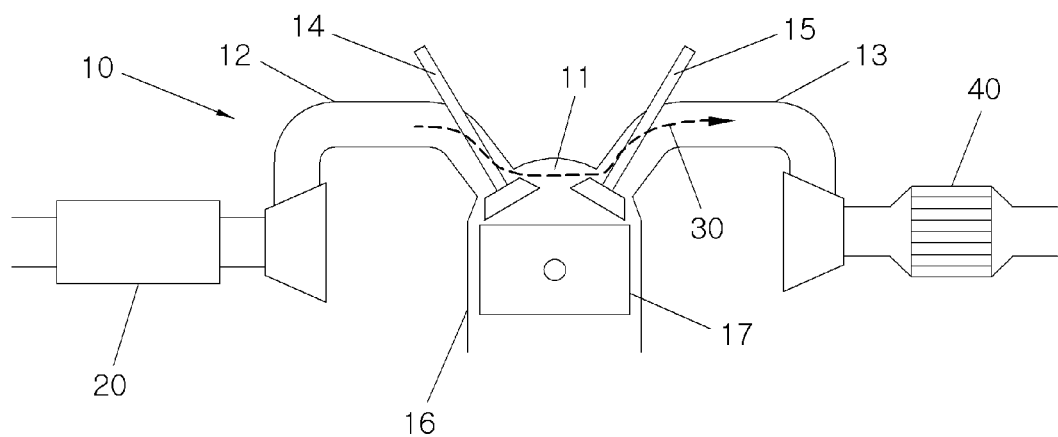
FIG. 5 is a drawing showing a conventional internal combustion engine having a scavenging phenomenon.

FIGS. 4A and 4B show a drawing comparing a method for controlling an internal combustion engine according to the present disclosure and the effects thereof with the related art.

FIG. 4A shows the result that the method for controlling variable valve timing in an internal combustion engine according to the present disclosure is not implemented. As shown FIG. 4A, the control amount in the variable valve timing (VVT) apparatus is maintained to be higher within the scavenging period so that the valve overlap period is also maintained to be longer. Thus, the temperature of the catalyst in the exhaust system continuously rises so that the catalyst device is damaged.

FIG. 4B shows the result that the method for controlling variable valve timing in an internal combustion engine according to the present disclosure is implemented. As shown in FIG. 4B, the present disclosure may determine whether the engine is under the scavenging state, and reduce the control amount in the variable valve timing (VVT) apparatus on the basis of the entry time that the scavenging state is in progress.

As a result, the valve overlap is reduced so that restraining overheating of the catalyst according to excessive supply of un-burn fuel can be found.

Accordingly, the present disclosure may derive the effect of effectively preventing damage of a catalyst device in an exhaust system by adjusting a control amount of a variable valve timing apparatus on the basis of the time that the scavenging state is being in progress when the engine is under the scavenging state.

Although the exemplary embodiments in the present disclosure have been disclosed for illustrative purposes, those skilled in the art will appreciate that various modifications, additions, and substitutions are possible, without departing from the scope and spirit of the invention as disclosed in the accompanying claims.

What is claimed is:

1. An apparatus for controlling a variable valve timing (VVT) which varies an opening and closing time of an intake valve and an exhaust valve in an internal combustion engine by controlling a rotation phase of a camshaft with respect to a crankshaft of the internal combustion engine, the apparatus comprising:
    a controller configured to determine when an engine state enters a scavenging region in an overlap area of the intake valve and the exhaust valve,
    wherein the controller controls the VVT to reduce a valve overlap period depending on a period of time elapsed after the engine state enters the scavenging region.

2. The apparatus of claim 1, wherein the controller determines when the engine state enters the scavenging region by combining at least two measurement values among the VVT, a revolutions per minute (RPM) of the internal combustion engine, a pressure of an intake port, and a temperature of the internal combustion engine.

3. The apparatus of claim 1, wherein the controller reduces the valve overlap period by adjusting the VVT when the period of time elapsed exceeds a reference time period.

4. The apparatus of claim 3, wherein the controller measures a period of time elapsed after the internal combustion engine leaves the scavenging region when the engine state leaves the scavenging region and sets a second entry time period by subtracting the period of time elapsed after the engine state leaves the scavenging region from the first entry time period to adjust the VVT.

5. A method for controlling a variable valve timing (VVT) which varies an opening and closing time of an intake valve and an exhaust valve in an internal combustion engine by controlling a rotation phase of a camshaft with respect to a crankshaft of the internal combustion engine, the method comprising:
    determining when an engine state enters a scavenging region in an overlap area of the intake valve and the exhaust valve;
    measuring a first entry time period elapsed after the engine state enters the scavenging region;
    adjusting a control correction amount of the VVT with respect to the intake valve or the exhaust valve depending on the first entry time period; and
    reducing a valve overlap period by adjusting the VVT depending on the control correction amount.

6. The method of claim 5, wherein determining when the engine state enters the scavenging region is based on at least two measurement values among the VVT, a revolutions per minute (RPM) of the internal combustion engine, a pressure of an intake port, and a temperature of the internal combustion engine.

7. The method of claim 5, further comprising:
    measuring a period of time elapsed after the engine state leaves the scavenging region when determination is made that the internal combustion engine leaves the scavenging region; and
    calculating a second entry time period by subtracting the period of time elapsed after the engine state leaves the scavenging region from the first entry time period.

8. The method of claim 5, wherein the control correction amount is adjusted towards a direction of reducing the valve overlap period when the first entry time period exceeds a first predetermined value.

9. The method of claim 8, wherein the control correction amount is adjusted towards a direction of increasing the valve overlap period when the first entry time period is equal to or less than the first predetermined value.

10. The method of claim 8, wherein, when the control correction amount becomes zero, determination is made that control of the VVT is no longer necessary and adjusting the control correction amount ends.

* * * * *